(12) United States Patent
Von Maydell

(10) Patent No.: US 9,804,019 B2
(45) Date of Patent: Oct. 31, 2017

(54) METHOD AND DEVICE FOR MEASURING THE LENGTH AND WEIGHT OF A BODY

(71) Applicant: seca ag, Reinach (CH)

(72) Inventor: Marc-Oliver Von Maydell, Hamburg (DE)

(73) Assignee: SECA AG, Reinach (CH)

( * ) Notice: Subject to any disclaimer, the term of this patent is extended or adjusted under 35 U.S.C. 154(b) by 65 days.

(21) Appl. No.: 14/719,896

(22) Filed: May 22, 2015

(65) Prior Publication Data

US 2015/0346019 A1 Dec. 3, 2015

(30) Foreign Application Priority Data

May 28, 2014 (DE) .................. 10 2014 008 557

(51) Int. Cl.
 *G01G 19/46* (2006.01)
 *G01G 19/50* (2006.01)

(52) U.S. Cl.
 CPC ............. *G01G 19/50* (2013.01); *G01G 19/46* (2013.01)

(58) Field of Classification Search
 CPC ................................ G01G 19/46; G01G 19/50
 See application file for complete search history.

(56) References Cited

U.S. PATENT DOCUMENTS

| | | | | |
|---|---|---|---|---|
| 3,576,128 A | * | 4/1971 | Lockery ................. | G01L 1/2262 177/211 |
| 3,637,034 A | * | 1/1972 | Wickenberg ........... | G01G 19/44 177/208 |
| 3,656,569 A | * | 4/1972 | Johnson .................... | G01G 3/02 177/210 R |
| 3,808,694 A | * | 5/1974 | Hutchinson .......... | A61B 5/1072 177/245 |
| 4,134,213 A | * | 1/1979 | Kushmuk .............. | G01B 3/004 33/512 |
| 4,396,080 A | * | 8/1983 | Dee .......................... | G01G 3/14 177/1 |
| 4,503,922 A | * | 3/1985 | Brosh ...................... | G01G 3/14 177/210 EM |
| 4,623,029 A | * | 11/1986 | Bambauer .............. | G01G 19/08 177/137 |
| 4,718,507 A | * | 1/1988 | Howlett .................. | G01B 11/02 177/210 FP |
| 4,923,024 A | * | 5/1990 | Ferrer ..................... | G01G 19/50 177/245 |
| 5,161,628 A | * | 11/1992 | Wirth ................... | G01G 23/002 177/137 |

(Continued)

*Primary Examiner* — Randy Gibson
(74) *Attorney, Agent, or Firm* — Lucas & Mercanti, LLP; Klaus P. Stoffel

(57) ABSTRACT

A method and device for simultaneously measuring the mass and the height of a body, wherein the measurement of the body mass is carried out by measuring the deformation of at least one deformable element, during which a scale platform is lowered, and the height measurement is realized as an absolute distance measurement relative to the scale platform, so that the distance measurement is subject to an error equal to the amount by which the scale platform is lowered. The error-prone distance measurement is converted by a correction factor into a height measurement value the absolute value of which corresponds to the averaged lowering of the scale platform.

13 Claims, 1 Drawing Sheet

(56) References Cited

U.S. PATENT DOCUMENTS

| | | | | |
|---|---|---|---|---|
| 5,174,402 | A | * | 12/1992 | Chen ...................... G01G 19/50 |
| | | | | 177/245 |
| 5,415,176 | A | * | 5/1995 | Sato .................... A61B 5/0537 |
| | | | | 177/245 |
| 5,763,837 | A | * | 6/1998 | Davignon .............. G01G 19/50 |
| | | | | 128/921 |
| 7,200,952 | B2 | * | 4/2007 | Montagnino ........ A61B 5/0537 |
| | | | | 33/512 |
| 2006/0158337 | A1 | * | 7/2006 | Cohen ................. A61B 5/7475 |
| | | | | 340/666 |
| 2016/0091359 | A1 | * | 3/2016 | Alam .................... G01G 19/50 |
| | | | | 177/1 |

\* cited by examiner

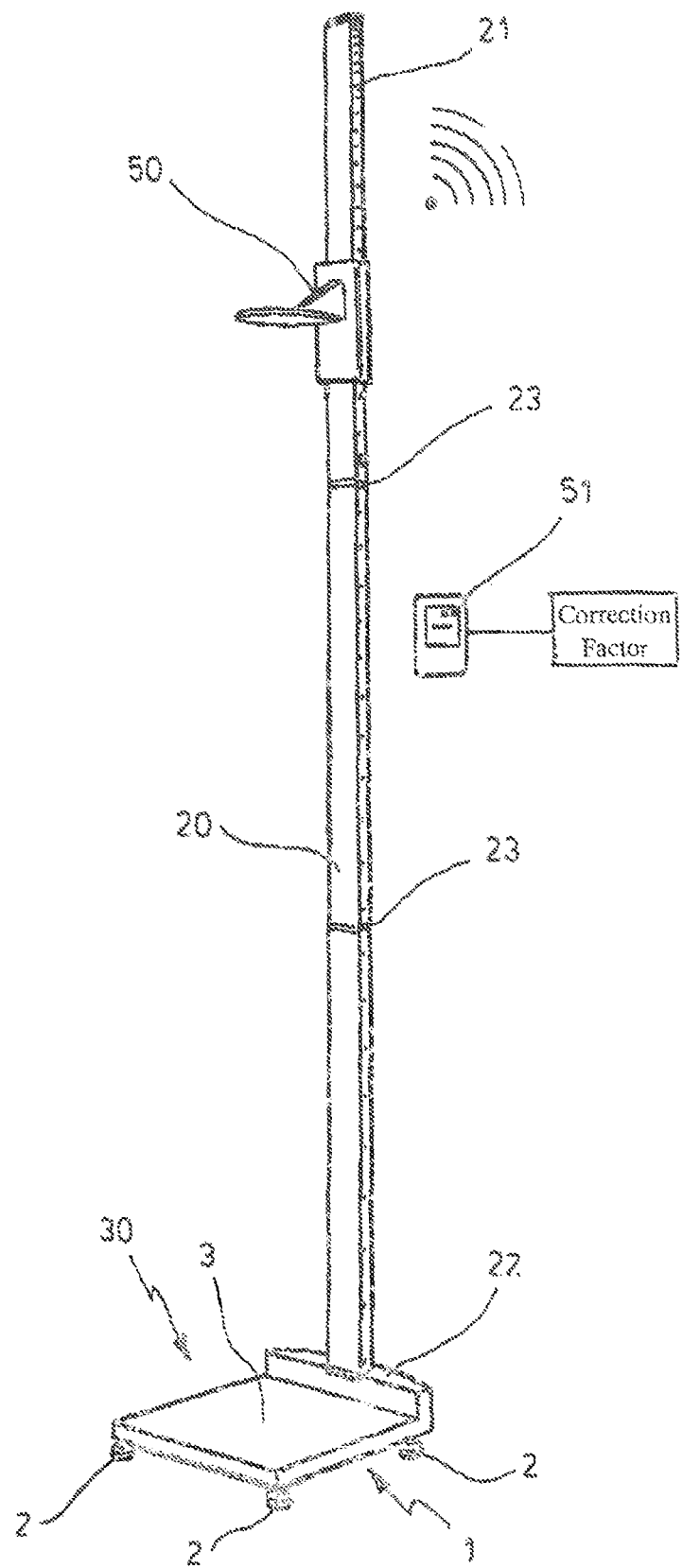

METHOD AND DEVICE FOR MEASURING THE LENGTH AND WEIGHT OF A BODY

CROSS-REFERENCE TO RELATED APPLICATIONS

The present application claims priority of DE 10 2014 008 557.0, filed May 28, 2014, the priority of this application is hereby claimed and this application is incorporated herein by reference.

BACKGROUND OF THE INVENTION

The invention pertains to a method and a device for simultaneously measuring the mass and the height of a body, wherein the body mass is determined by measuring the deformation of at least one deformable element, wherein a scale platform is lowered, and the height measurement is realized as an absolute distance measurement to the scale platform, with the result that the distance measurement suffers from an error equal to the amount by which the scale platform has been lowered.

It is known that scales are used to determine the weight of subjects or objects. Physically, the weight of a body is taken as the force exerted on it by gravity, i.e., its weight force, which experiences gravitational acceleration. Mass could be measured directly by determining the volume and the specific density of this body. In many cases, however, a scale determines the weight of a body by determining its weight force as an elastic deformation measurement. According to this measurement method, which many scales adopt, the elastic deformation distance of a spring, resulting from the weight force acting on it, is determined versus its more-or-less constant, i.e., linear, spring characteristic. The mass is then obtained by dividing the spring constant by the deformation distance. This also means that a weight determination usually involves working with a deformation distance of a spring or of some other elastic object with a spring constant.

In modern scales, at least one load cell is often used, which is arranged under a support surface. The support surface, i.e., the scale platform, serves to hold and support the body to be measured, and during a weight measurement, it is lowered by a distance equivalent to the deformation of the load cell.

One problem with the use of devices which offer both a weighing function and a height measuring device and which are intended to determine both values simultaneously is to be found in the movement of the support surface of the scale platform from its original position to a lower one. Under the assumption that the height measurement is not being made relative to the scale platform, the lowering of the scale platform means that the height measurement suffers from an error equal to the distance by which the platform is lowered.

In principle, a quasi-systematic height measurement error caused by the lowering of the scale platform could be compensated by conducting the height measurement relative to the scale platform. This could be realized by mounting the height-measuring device on the scale platform, so that the height measuring device is lowered to the same extent as the platform. With this structural configuration, however, the at least one load cell, which is an elastic element, would necessarily have to absorb all of the forces and moments introduced into the scale platform from the upper structure, and therefore adequate stability is not always guaranteed.

An additional problem is that the conventional scale platforms are usually not large enough to support both the body to be measured and the height-measuring device. It is thus difficult to find an easy way to realize a height measurement relative to the scale platform. What must be taken into account, therefore, is the change in the distance between the scale platform and the height-measuring means, usually a headpiece, as a result of the weight force of the body acting on the platform. Measurement errors on the order of several millimeters can thus occur. Measurement errors of more than a centimeter are also possible.

SUMMARY OF THE INVENTION

It is therefore the goal of the invention to provide a method and a device for the combined measurement of the weight and the height of a body in which the measurement error of the height measurement is at least reduced.

According to the invention, this goal is achieved by correcting the initially erroneous distance measurement.

The invention realizes that the necessary height measurement correction is preferably carried out by means of an electronic post-correction, which can be based on various approaches, realized either alternatively or additively.

The invention also provides that the structural design freedom resulting from the height measurement correction can be exploited to improve the results of the height measurement even more.

According to a first variant of the invention, a correction factor based on the weight force-versus-deformation characteristic of the at least one load cell is incorporated into the electronically recorded height value. The characteristic curve of a load cell is given by the manufacturer or can be determined from a series of experiments and can be implemented in the electronically recorded height value either as a parameter-describing equation or in the form of table values. From the correlation between the determined weight of the measured body and the associated deformation distance of the at least one load cell, it is possible to find the measurement error of the simultaneous height measurement and to allow this to enter as a corrective into the end result.

According to another variant of the invention, the actual extent to which the scale platform is lowered is measured, and this value is used as a correction factor for the error-prone result of the height measurement. The determination of the extent of this lowering is a metrological distance measurement, for which various physical measurement principles are conceivable and realizable. In addition to opto-electronic image-processing methods with evaluation of the data before and during the time that the weight is acting on the platform, it is also possible to use travel-time measurements, to exploit the Doppler effect, or to use measurement methods based on electrical relationships (strain gauges, differences in potential, capacitance ratios, or resistances).

According to another variant of the invention, both the actual lowering of the scale platform and its inclination are detected. "Inclination" according to the invention is to be understood as any position of the scale platform deviating from the horizontal. Types of scales are known in which more than one load cell are used underneath the platform. The range over which measurements can be made can be increased by the use of, for example, three or four symmetrically or asymmetrically arranged load cells.

If bodies of considerable volume are to be subjected to a weight measurement, scales with large scale platforms may be necessary, and such large platforms require at least more than one load cell suitably arranged under the platform. Platforms with relatively large support surfaces bring with them the risk that, if the weight force is not centered, the platform will tilt, with the result that some of the load cells will undergo different degrees of deformation than others.

An inclination of the scale platform can also occur even if only a single load cell is used. The invention optimizes the accuracy of the height measurement results based on these situations in that this inclination of the scale platform is also determined, and the height measurement result is corrected on that basis. For this purpose, the inclination can be determined optically, for example. When more than one load cell is being used, e.g., when four load cells are used, the deformation distance of each load cell can be detected separately and processed in the electronic unit for recording the height value to obtain a correction factor.

Optionally, the correction factor determined on the basis of the various approaches according to the invention can also be integrated afterwards, that is, off-line, or externally into the error-prone height measurement result and not by the electronic unit for recording the height value.

In addition to the correction factor for the height measurement, additional factors which influence the weight or height measurement result can be taken into account as correction factors both during the determination of the measurement value and also afterwards and possibly externally, such as the influence of temperature on the lowering of the scale platform or a mounting surface for the device which is not exactly horizontal. A local difference in the acceleration due to gravity can also be a primary factor influencing the weight force.

As a result of the insight according to the invention that the lowering of the scale platform is acknowledged as a source of error during a simultaneous height measurement, which is then corrected, the structural design of the device can be optimized to obtain the highest possible accuracy of the height and weight measurements.

The scale components of the device can be optimized by designing them for the weight determination without having to make any compromise with respect to the height value determination. The scale platform can be made in such a way that its surface is just large enough to accommodate the body to be measured. Because the height-measuring component of the device is not mounted on the scale platform, it can be executed as a sturdy structure for mounting on the base element. The base element can be configured as a plate-shaped foot part or preferably as a frame, so that both the height-measuring component and the scale component can be accommodated.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:
FIG. 1 shows a perspective front view of the height-measuring device with weighing device.

DETAILED DESCRIPTION OF THE INVENTION

FIG. 1 shows a perspective front view of the height-measuring device with weighing device. A profiled post 20 is mounted on a base element 30, the center axes of the two components being preferably at a right angle to each other; on the profiled post, a vertically movable head slide 50 is mounted in such a way that the height measurement data can be acquired by means of a height measurement scale 21 and an electronic measurement value readout 51.

The profiled post 20 is connected either detachably or nondetachably to the base element 30 by means of a fastening shoe 22. The profiled post 20 can be disassembled at various points in the longitudinal direction, i.e., at the joints 23 between its parts, so that its size can be reduced for packaging and transport.

The base element 30 comprises a scale 1, which typically is provided with support feet. The scale 1 comprises a support surface 3.

A load cell can be arranged in the area of at least one of the feet 2, preferably in the area of each foot 2. In principle, however, it is also possible to locate one or more load cells in the area of the support structure of the scale 1 (not visible in FIG. 1) located geometrically between the support surface 3 and the support feet 2.

The measurement readout 51 is typically configured as a display unit. Here both measurement values for the just-completed height measurement and the measurement values for the completed weight measurement can be displayed. The display unit can also show other data such as the date and time.

The height data acquired by the use of the head slide 51 and/or the weight data acquired by the use of the scale 1 can be transmitted in either a wired or a wireless manner.

While specific embodiments of the invention have been shown and described in detail to illustrate the inventive principles, it will be understood that the invention may be embodied otherwise without departing from such principles.

I claim:

1. A method for simultaneously measuring mass and height of a body, comprising the steps of: measuring the body mass by measuring deformation of at least one deformable element, during which a scale platform is lowered; and realizing the height measurement as an absolute distance measurement relative to the scale platform, so that the distance measurement is subject to an error equal to an amount by which the scale platform is lowered, wherein the error-prone distance measurement is converted by a correction factor into a height measurement value that corresponds to an averaged lowering of the scale platform.

2. The method according to claim 1, wherein the correction factor is based on a weight force-versus-deformation curve of the at least one deformable element, so that the lowering of the scale platform is correlated with the measured weight force of the body.

3. The method according to claim 2, wherein the weight force-versus-deformation curve is expressed mathematically.

4. The method according to claim 2, wherein the weight force-versus-deformation curve is expressed as tabular values.

5. The method according to claim 1, including determining the lowering of the scale platform by measurement.

6. The method according to claim 5, wherein the measurement is a distance measurement based on image processing, on a travel-time measurement, or on an electrical relationship.

7. The method according to claim 1, wherein the amount of the determined lowering comprises, additively or alternatively, a possible inclination of the scale platform, so that the correction factor takes into account the inclination of the scale platform.

8. The method according to claim 7, including determining the inclination of the scale platform by measurement.

9. The method according to claim 8, wherein the inclination measurement is carried out optically by an image-processing method.

10. The method according to claim 7, wherein the inclination measurement includes evaluation of deformation distances of several deformable elements.

11. The method according to claim 1, wherein the amount of the determined lowering additively comprises at least one of the following additional influencing factors: a temperature influence; a difference in acceleration due to gravity; and a non-horizontal position of a device support surface, so that the correction factor takes into account the at least one additional influencing factor.

12. The method according to claim 1, including converting the error-prone distance measurement by a correction factor into a height measurement value in an electronic height measurement recording within the device.

13. The method according to claim 1, including converting the error-prone distance measurement into a height measurement value by the correction factor after the measurement has been sent as output to an external device.

* * * * *